United States Patent [19]

Aucoin

[11] Patent Number: 4,563,833
[45] Date of Patent: Jan. 14, 1986

[54] FISH HOLDING DEVICE

[76] Inventor: Raymond U. Aucoin, P.O. Box 777, St. James City, Fla. 33956

[21] Appl. No.: 712,084

[22] Filed: Mar. 15, 1985

Related U.S. Application Data

[63] Continuation-in-part of Ser. No. 503,519, Jun. 13, 1983, abandoned.

[51] Int. Cl.$^4$ .............................................. A01K 97/00
[52] U.S. Cl. ........................................ 43/54.1; 81/417; 81/424.5; 81/426.5; 7/128
[58] Field of Search ............... 43/4, 54.1; 81/424.5, 81/426.5, 416, 417, 415; 7/125, 126, 127, 128; 294/16

[56] References Cited

U.S. PATENT DOCUMENTS

| | | | |
|---|---|---|---|
| 198,678 | 12/1877 | Poole | 81/424.5 |
| 1,250,365 | 12/1917 | Selden | 81/424.5 |
| 1,891,865 | 12/1932 | Beck | 81/426.5 |
| 2,392,118 | 12/1949 | Cacarillo | 81/417 |
| 2,563,267 | 8/1951 | Petersen | 81/424.5 |
| 2,643,151 | 6/1953 | Zupancic | 43/54.1 |
| 3,367,703 | 2/1968 | Pittis | 294/16 |
| 3,664,703 | 5/1972 | Talley | 294/16 |
| 3,808,915 | 5/1974 | Bonnel | 81/5.1 R |

FOREIGN PATENT DOCUMENTS 486119  11/1953  Italy ............................................. 7/5

Primary Examiner—Nicholas P. Godici
Assistant Examiner—C. McKee
Attorney, Agent, or Firm—Alfred E. Wilson

[57] ABSTRACT

A fish holding device of the pliers type having longitudinally curved jaws with well rounded transversely extending grooves providing broad teeth having rounded surfaces to engage and hold a fish without seriously injuring the fish or piercing the scales or skin of the fish. The device has two identical jaw and handle members pivoted together between the jaw and handle members and yieldingly urged to the open or operative position. The jaws are relatively narrow, of the order of one half inch so that one of the jaw elements can be projected into the mouth of a fish and the other jaw element can engage the exterior of the fish's lower jaw so that the fish can be safely manipulated. The device has a pivoted clamp or bail carried by the end of one of the handle members to loop over the end of the other handle member to hold the device in a closed or carrying position, but which can be released by a one-handed operation by merely holding the device vertically and compressing the handles slightly whereupon the clamp or bail falls off of the non-pivoted handle and the spring opens the device to ready it for immediate use.

1 Claim, 5 Drawing Figures

FISH HOLDING DEVICE

This is a continuation-in-part of application Ser. No. 503,519, filed 6/13/83, now abandoned.

BACKGROUND OF THE INVENTION

There has long been a need for a fish holding device which can securely hold a fish while the fish is on a fisherman's line to permit the fisherman to release the hook from the fish's mouth with as little damage to the fish as possible and without danger of the fisherman being impaled on the hook or being injured by the fish's teeth or fins. It frequently happens that a fisherman wishes to release a fish that has been caught and return him to the water. When the fish is to be released it is important that the fish be firmly held so that the hook can be removed as quickly as possible so that the fish can be returned to the water promptly, and that the fish be held in such a manner as not to crush or puncture the fish by the teeth of the holding device. It is also of importance where the fish is to be kept that the flesh not be damaged any more than is necessary during the operation of removing the fish from the hook.

DESCRIPTION OF THE PRIOR ART

Many devices have been devised to hold fish after they have been caught to enable the fisherman to remove the hook from the fish's mouth. Possibly the best known of the prior art devices is embodied in U.S. Pat. No. 3,367,703 issued Feb. 6, 1968, to Harry Pittis. This device, while being representative of the prior art fails to embody the features that have been recognized as being desirable for the following reasons. (1) the teeth 23-25 are conical shaped having sharp points which can easily puncture the fish held by the device; (2) the device is not yieldingly urged to the operative or open position so as to be readily operative with a one-hand operation while a fisherman has a fish on the line; (3) the jaws 19 and 21 are straight in the operative area where a fish would normally be held. As a result high loading is exerted on the fish which results in serious danger of permanently injuring the fish which is undesirable in instances where the fish is to be returned to the water. These difficulties are overcome where the fish engaging jaws are arcuately shaped and the transversely extending ridges rather than spikes are employed to engage and hold the fish.

SUMMARY OF THE INVENTION

By this invention a fish holding device is provided wherein a pliers type gripping device is provided with curved or arcuately shaped jaws having shallow transversely extending ribs to engage a fish which has been caught to enable the fisherman to securely hold the fish without serious injury to the fish to enable the fisherman to remove the hook from the fish's mouth. The teeth are wide transversely of the jaws and they are shallow and well rounded so as to engage the fish over a relatively broad area so as to avoid localized pressure that would result in permanent injury and which would not break through the fish's scales or skin.

The device is designed to permit quick one-handed operation while a fish is on the line by merely gripping the device and holding it in an upright position, and compressing the handles slightly to permit the clamp or bail to fall away whereupon the spring separates the jaws thereby rendering the device ready for instant operation so that the fish can be held firmly between the jaws to enable the fisherman to remove the hook from the fish's mouth. The device has transversely extending teeth at the outer ends of the jaws which come together to permit the fisherman to engage a thin object such for example as a fish's tail so as to hold the fish or other marine life.

BRIEF DESCRIPTION OF THE DRAWINGS

Referring now to the drawings wherein similar reference characters refer to similar parts throughout the several views.

DESCRIPTION OF THE PREFERRED EMBODIMENT

Figure 1:
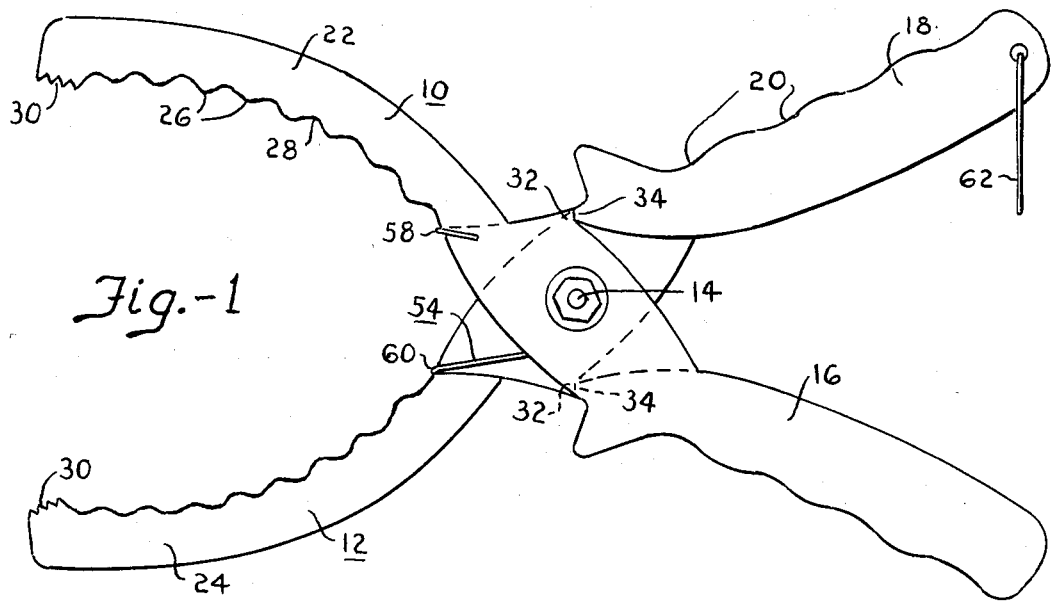
FIG. 1 is a side elevational view of the fish holding device, shown in the open or ready to use position.
Figure 2:
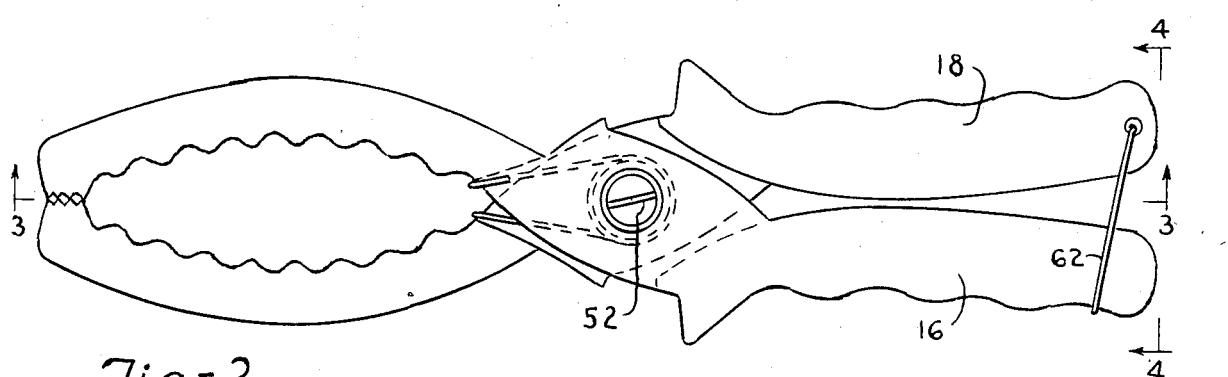
FIG. 2 is a view similar to FIG. 1 showing the device in the closed or carrying position.

Referring now to the drawings it will be noted that two identical handle and jaw members 10 and 12 are pivoted together at 14. I have found that a Fish Holding Device of approximately 9½" in length provides a convenient and very workable device. To conveniently illustrate the device a scale of approximately 80% of the total length of the device was selected. The handle and jaw members have hand grip portions 16 and 18 having contoured finger grip areas. The jaw portions 22 and 24 are arcuately curved as illustrated in FIGS. 1 or 2, and have transversely extending teeth or ridges 26 positioned for example approximately 7/16" apart, and having correspondingly spaced grooves 28 of approximately 3/16" in depth so as to provide a relatively wide fish contacting area so as to spread the fish contacting force exerted on the fish over a relatively wide area of the fish's body to firmly hold the fish without crushing him or puncturing his skin. The ends of the jaws 22 and 24 have transversely extending corrugations or teeth 30 to engage each other with light pressure when the device is moved to the closed position so as to permit the engagement and holding of a relatively thin object such as the tail of a fish. When in the closed position the distance between the teeth or ridges 26 is approximately 1⅛" apart.

The jaws 22 and 24 are relatively narrow, such for example as one-half inch wide, so as to permit a fisherman to project one of the jaw members 22 or 24 into the mouth of a fish and to engage the other jaw member beneath the lower jaw of the fish to permit the fisherman to conveniently handle the fish.

The handle and jaw members 10 and 12 have cooperation stop members 32 and 34 adapted to contact each other to limit the opening position of the jaws 22 and 24 as illustrated in FIG. 1. The closed or operative position of the jaws 22 and 24 is illustrated in FIG. 2 and is limited by contact of the corrugations or teeth 30 of the jaw members 22 and 24.

Figure 3:
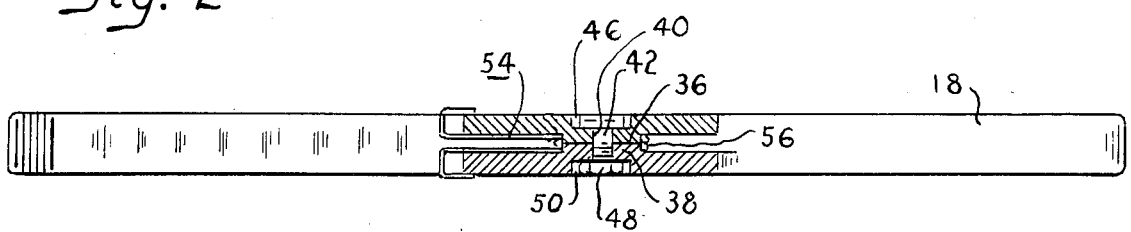
FIG. 3 is a sectional view taken substantially on the line 3—3 of FIG. 2 looking in the direction of the arrows.
Figure 4:
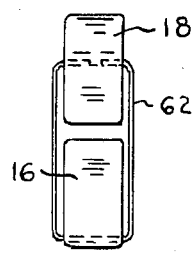
FIG. 4 is an end elevational view taken substantially on the line 4—4 of FIG. 2 looking in the direction of the arrows.

As illustrated in FIG. 3 the handle and jaw members 10 and 12 have thin axially extending pads 36 and 38 having a central aperture 40 to receive a threaded stud 42 adapted to project through the aperture 40 in the pads 36 and 38 and having a head 44 to be received in a countersunk aperture 46 in one of the handle and jaw members 10 or 12. The threaded stud 42 is adapted to receive a nut 48 adapted to lie in a countersunk aperture 50 in the other of the handle and jaw members 10 and 12. The head of the stud 42 is provided with a screwdriver slot 52 to permit turning of the stud 42 as may be desired in assembly or disassembly of the device.

The handle and jaw members 10 and 12 are yieldingly urged to the open position illustrated in FIG. 1 by a spring 54 having a central portion 56 wrapped about the thin pads 36 and 38 of the handle portions 10 and 12 as illustrated in FIG. 3, and having terminal extensions 58 and 60 engaging the inner edges of the jaw members 22 and 24 to yieldingly urge the handle and jaw members to separate to the operative or fish receiving position as illustrated in FIG. 1.

A loosely fitting bail 62 carried by one of the hand grip portions 16 or 18 and adapted to extend over the other hand grip portion 16 or 18 to hold the device in the closed or carrying position illustrated in FIG. 2. The bail 62 is a relatively loose fit over the hand grip potion of the handle so as to be readily actuated by gravity to engage or disengage the handles.

In operation while fishing, the fish holding device can be laid at any convenient spot near where the fisherman is attempting to catch a fish, the device being in the position shown in FIG. 2. When the fisherman succeeds in getting a fish on the line he can grasp the hand grip portions 16 and 18 of the handles of the device and hold it vertically with the bail 62 at the bottom. He can then compress the handles 16 and 18 slightly whereupon the bail 62 will disengage from the handle portion, and the spring 54 will separate the jaws 22 and 24 so that the device is immediately ready to participate in the fish holding operation. The fish can then be held between the jaws with no danger of injuring the fish no more than is necessary to enable the fisherman to remove the hook. If the fish is to be returned to the water he can immediately be released without the fisherman needing to contact the fish.

Figure 5:
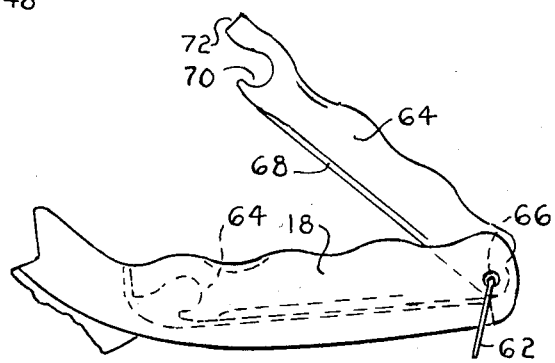
FIG. 5 is a fragmentary view illustrating an adjunct that can be added to the invention.

As illustrated in FIG. 5, a utility blade 64 may be pivotally mounted in the outside of the handle 16 or 18 which has the bail 62 pivoted thereon. The blade 64 is pivoted at 66 in the outer end of the hand grip portion 18 having the bail 62. The blade 64 is yieldingly urged to the fully closed or fully open position by the usual pocket knife blade spring. The utility blade has for example a knife of cutting blade portion 68, and near its outer end 72 is shaped to provide a screwdriver blade 72. These accessories which are frequently needed while on a fishing expedition are thus readily available for use whenever the occasion arises that such a device is needed.

Where large fish are caught, such for example the Grouper or Snook where the fish is so large that the fish back of the head will not fit into the Fish Holding Device, the device can be used as a gaff by projecting one jaw of the device into the fish's mouth with the other jaw under the fish's lower jaw to act as a gaff to pull the fish from the water. This phase of the operation is also applicable where the fish is to be released.

Attention is also directed to the fact that this is an accessory which can readily be used for many purposes, such for example, in addition to its use as a fish holding device it is readily usable to hold crabs of all types and lobsters. Aside from the uses in the fishing and related fields it is also extremely useful as a jar or bottle opener where the closures are of the screw on type, and as a nut cracker or to squeeze together the split shot type sinker which is to be clamped to engage a fish line.

I claim:

1. A fish holding device comprising two identical contoured members, each having handle and jaw elements pivoted together at a point between said handle and jaw elements, and biasing means urging the jaw elements toward an open position, said jaw elements being relatively narrow, elongated and in substantial part, arcuately curved with transversely extending shallow rounded fish contacting corrugations, the terminal ends of the jaw elements being planar and having transversely extending teeth adapted to come together when the handle elements are in a closed position leaving the central portion of said jaw elements arcuately spaced from each other a distance of at least one inch at the widest point for accommodating a captured fish in a non-injurious manner, said contacting portions being spaced approximately 7/16 of an inch apart and being approximately 3/16 of an inch in depth, the width of said jaw elements being approximately 1/10 the length of said jaw elements, the length of said jaw elements being substantially equal to that of the handle elements to permit, in an alternative mode of usage, one of the jaw elements to be projected into a fish's mouth whereby the jaw elements of the fish holding device can clamp the lower jaw of the fish to hold and manipulate said fish.

* * * * *